United States Patent
Van Baelen

(10) Patent No.: US 10,215,943 B2
(45) Date of Patent: Feb. 26, 2019

(54) DEPLOYING OPTICAL FIBERS WITHIN A MULTI-DWELLING UNIT

(71) Applicant: CommScope Connectivity Belguim BVBA, Kessel-Lo (BE)

(72) Inventor: David Jan Irma Van Baelen, Winksele (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

(21) Appl. No.: 15/565,094

(22) PCT Filed: Apr. 8, 2016

(86) PCT No.: PCT/EP2016/057740
§ 371 (c)(1),
(2) Date: Oct. 6, 2017

(87) PCT Pub. No.: WO2016/162474
PCT Pub. Date: Oct. 13, 2016

(65) Prior Publication Data
US 2018/0100981 A1 Apr. 12, 2018

Related U.S. Application Data

(60) Provisional application No. 62/144,691, filed on Apr. 8, 2015.

(51) Int. Cl.
*G02B 6/44* (2006.01)
*G02B 6/38* (2006.01)
*G02B 6/255* (2006.01)

(52) U.S. Cl.
CPC ......... *G02B 6/4446* (2013.01); *G02B 6/3897* (2013.01); *G02B 6/444* (2013.01);
(Continued)

(58) Field of Classification Search
None
See application file for complete search history.

(56) References Cited

U.S. PATENT DOCUMENTS

| | | | | |
|---|---|---|---|---|
| 2010/0080524 A1* | 4/2010 | Ciechomski | ......... | G02B 6/4441 385/135 |
| 2010/0329624 A1* | 12/2010 | Zhou | .................... | G02B 6/4454 385/135 |
| 2014/0150971 A1 | 6/2014 | Mann | | |

FOREIGN PATENT DOCUMENTS

| DE | 20 2011 107 742 U1 | 1/2012 |
|---|---|---|
| EP | 1 944 886 A1 | 7/2008 |

(Continued)

OTHER PUBLICATIONS

International Search Report and Written Opinion of the International Searching Authority for corresponding International Patent Application No. PCT/EP2016/057740 dated Jul. 5, 2016, 14 pages.

*Primary Examiner* — Tina M Wong
(74) *Attorney, Agent, or Firm* — Merchant & Gould P.C.

(57) ABSTRACT

Cabling a terminal access cable through a residence includes optically coupling an end of a subscriber cable to a first end of a terminal access cable within a transition anchoring the terminal access cable to an anchor surface (202) formed as a flange surrounding the side walls (203) of the transition box with adhesive; storing excess length of the terminal access cable at a storage location (207) within the transition box; routing the terminal access cable from the transition box to a wall outlet box; anchoring the terminal access cable to an anchor surface of the wall outlet box with adhesive; and routing a second end of the terminal access cable into the wall outlet box and optically coupling the second end to a port of an optical adapter disposed within the wall outlet (Continued)

box. A jumper cable can be optically coupled to the subscriber cable by plugging a connectorized end of the jumper cable into the port.

23 Claims, 12 Drawing Sheets

(52) U.S. Cl.
CPC ......... *G02B 6/4457* (2013.01); *G02B 6/4471* (2013.01); *G02B 6/2553* (2013.01)

(56) References Cited

FOREIGN PATENT DOCUMENTS

| EP | 2 169 438 A1 | 3/2010 |
| EP | 2 450 727 A1 | 5/2012 |
| WO | 2008/137389 A1 | 11/2008 |
| WO | 2008/137894 A1 | 11/2008 |

\* cited by examiner

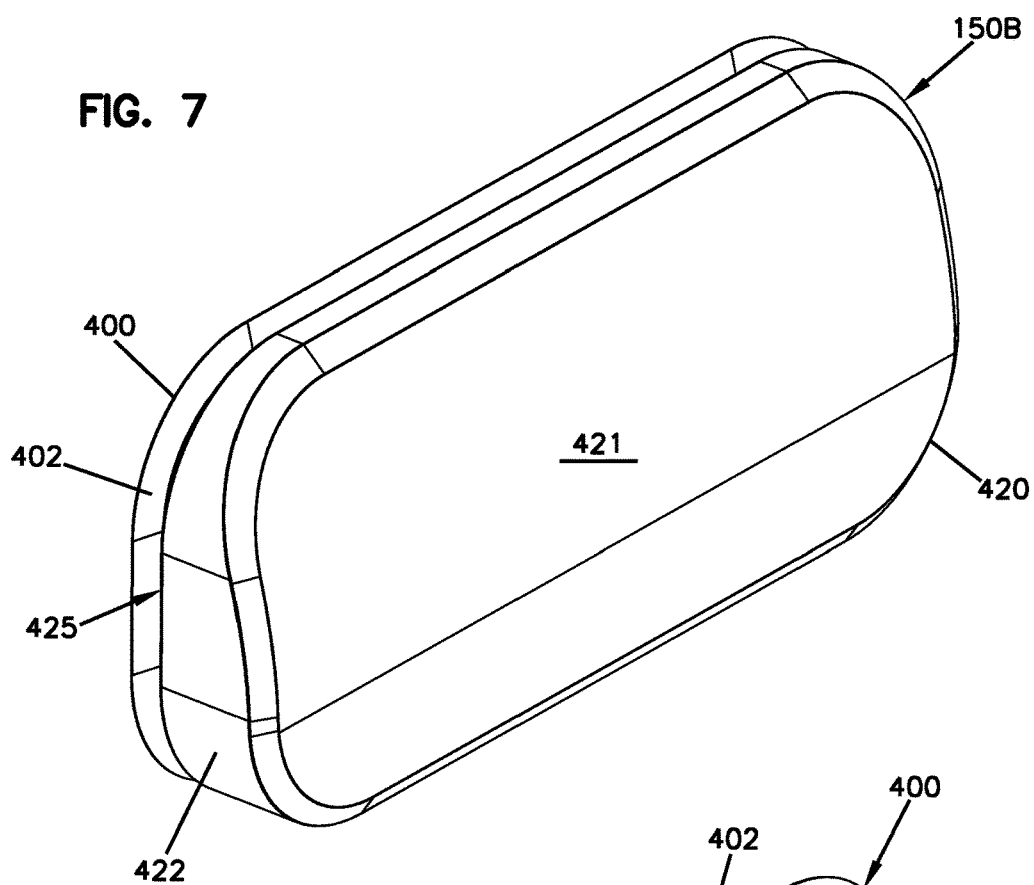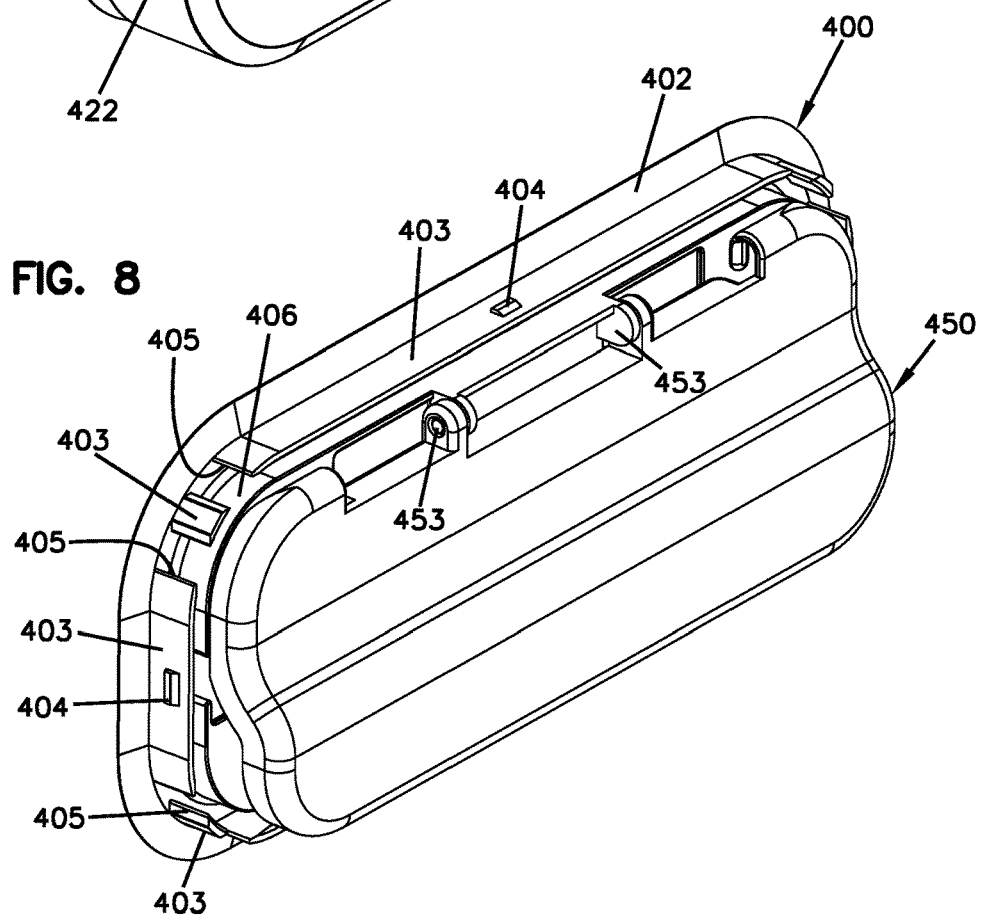

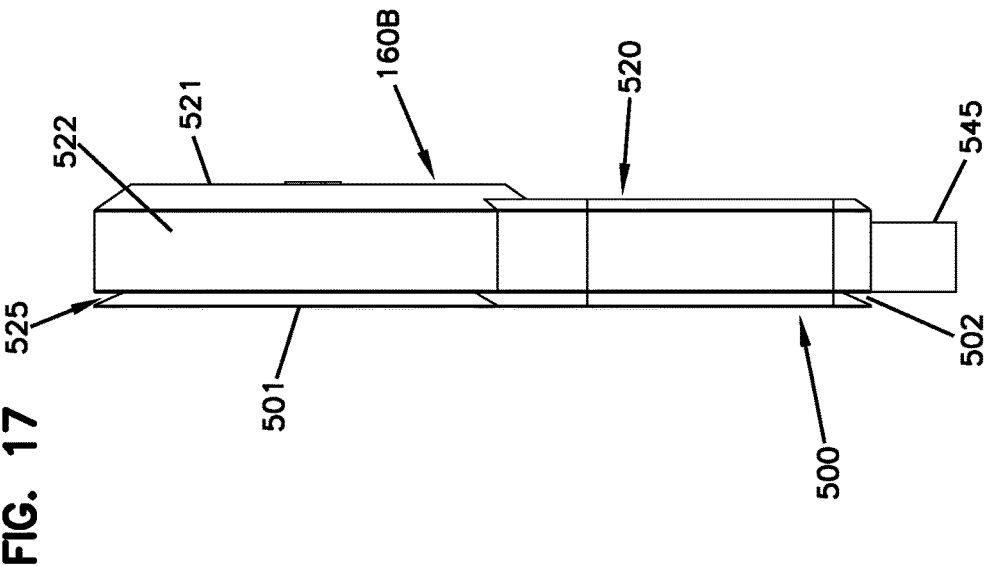
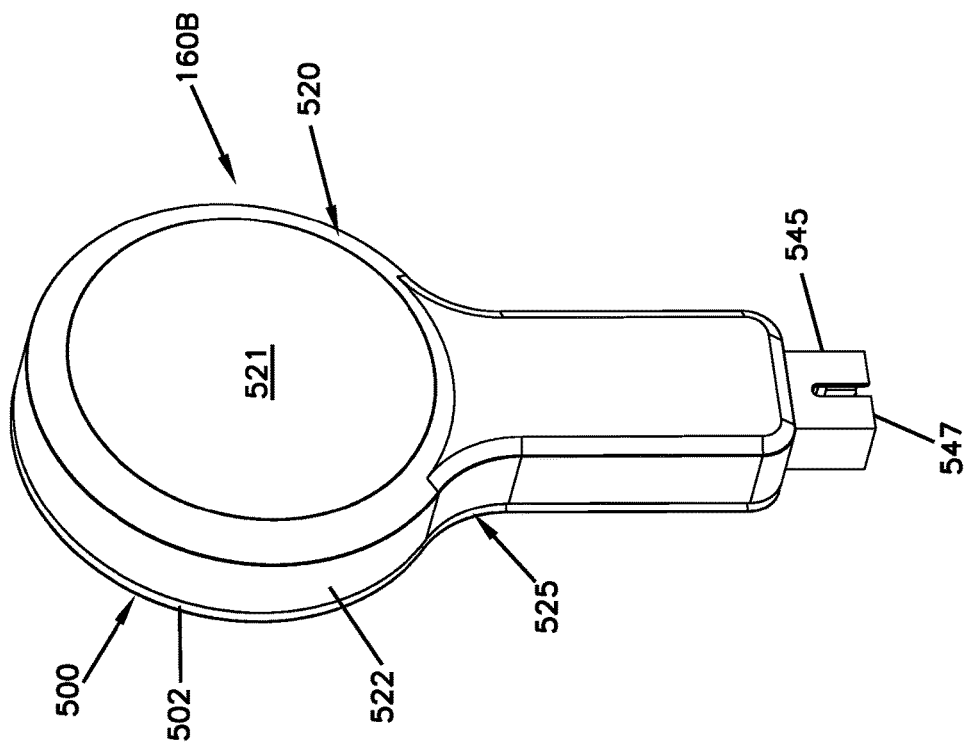

DEPLOYING OPTICAL FIBERS WITHIN A MULTI-DWELLING UNIT

CROSS-REFERENCE TO RELATED APPLICATION

This application is a National Stage Application of PCT/EP2016/057740, filed on Apr. 8, 2016, which claims the benefit of U.S. Patent Application Ser. No. 62/144,691, filed on Apr. 8, 2015, the disclosures of which are incorporated herein by reference in their entireties. To the extent appropriate, a claim of priority is made to each of the above disclosed applications.

BACKGROUND

Demand for fiber optic services is continuously increasing. In accommodating the need of current and future customers, fiber optic distribution cables are routed from a central office to extended areas. Providing fiber optic services to customers in some applications, such as to customers in a multiple dwelling unit, for example, involves splitting a fiber optic distribution cable into individual cables that are associated with a particular dwelling of the multiple dwelling unit.

In conventional arrangements, the distribution cable is routed from the central office to a large fiber distribution hub. The distribution cable is split out into a number of individual fiber optic cables at the fiber distribution hub. The individual fiber optic cables are then each routed to a wall-mount box located at the multiple dwelling unit. The large fiber distribution hub is located remote from the wall-mount box. Typically, the fiber distribution hub splits-out a number of multi-fiber distribution cables and feeds a number of wall-mount boxes.

In general, improvement of such multi-dwelling wall-mount boxes is needed.

SUMMARY

Aspects of the disclosure are directed to a cable management box including a base including a mounting surface configured to secure to a wall, an arrangement of one or more outer flanges extending outwardly from the base opposite the mounting surface, and a transition surface that leads from the wall to the outer flange arrangement. The base defines an anchor surface between the transition surface and the outer flanges. The base also defines a storage location at which a storage spool is disposed. The arrangement of outer flanges defines gaps that lead from the transition surface to the storage location.

In some implementations, the cable management box is a transition box.

In certain implementations, the transition box is configured to hold an optical splice between a subscriber cable and a terminal access cable. In certain examples, the base defines a splice location at which a splice sleeve holder is disposed. In an example, the splice location is disposed within an inner wall, which is disposed within the arrangement of outer flanges.

In certain implementations, the transition box is configured to hold an optical adapter receiving a connectorized end of a subscriber cable and a connectorized end of a terminal access cable. In certain examples, the base defines a termination location at which the optical adapter is disposed. In an example, the termination location is disposed on a movable member coupled to the base. The movable member is movable between an access position and a storage position.

In other implementations, the cable management box is a wall outlet box defining a routing channel that leads from the storage location to a termination location.

In certain implementations, an optical adapter is disposed at the termination location. The optical adapter defines a first port and a second port. The second port faces one of the gaps in the arrangement of outer flanges. In certain examples, the routing channel extends radially outwardly from the storage location. In an example, the wall outlet box has a light-bulb shape.

In certain implementations, the routing channel is disposed side-by-side with the storage location. In certain examples, the base defines a splice location within the outer flange arrangement.

In certain implementations, a cover that mounts to the base. The cover is spaced from the base by a gap sized to accommodate a cable extending over the transition surface. In examples, the cover is latched to the base.

Other aspects of the disclosure are directed to a method of cabling a terminal access cable including mounting a transition box and routing a subscriber cable into an interior of the transition box; optically coupling an end of the subscriber cable to a first end of a terminal access cable within the transition box; anchoring the terminal access cable to an anchor surface of the transition box with adhesive; storing excess length of the terminal access cable at a storage location within the transition box; routing the terminal access cable from the transition box to a wall outlet box; anchoring the terminal access cable to an anchor surface of the wall outlet box with adhesive; and routing a second end of the terminal access cable into the wall outlet box and optically coupling the second end to a port of an optical adapter disposed within the wall outlet box. A jumper cable can be optically coupled to the subscriber cable by plugging a connectorized end of the jumper cable into the port.

In some implementations, optically coupling an end of the subscriber cable to a first end of a terminal access cable includes splicing an unterminated end of the subscriber cable to an unterminated first end of the terminal access cable.

In other implementations, optically coupling an end of the subscriber cable to a first end of a terminal access cable includes mounting optical connector housings to partially connectorized ends of the subscriber cable and terminal access cable; and plugging the optical connector housings into an optical adapter disposed within the transition box.

In some implementations, optically coupling the second end to a port of an optical adapter includes splicing the second end to a fiber pigtail that has a connectorized end plugged into another port of the optical adapter.

In other implementations, optically coupling the second end to a port of an optical adapter includes plugging the second end into another port of the optical adapter.

In certain implementations, the method includes routing the terminal access cable from the transition box to the wall outlet box includes routing the terminal access cable over transition surfaces of the transition box and the wall outlet box.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a perspective view of a second example termination box including a base and a cover;

FIG. 8 is a perspective view of the base of the termination box of FIG. 7 with a movable member in a storage position;

FIG. 16 is a perspective view of a second example wall outlet box including a base and a cover;

FIG. 17 is a side elevational view of the wall outlet box of FIG. 16;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
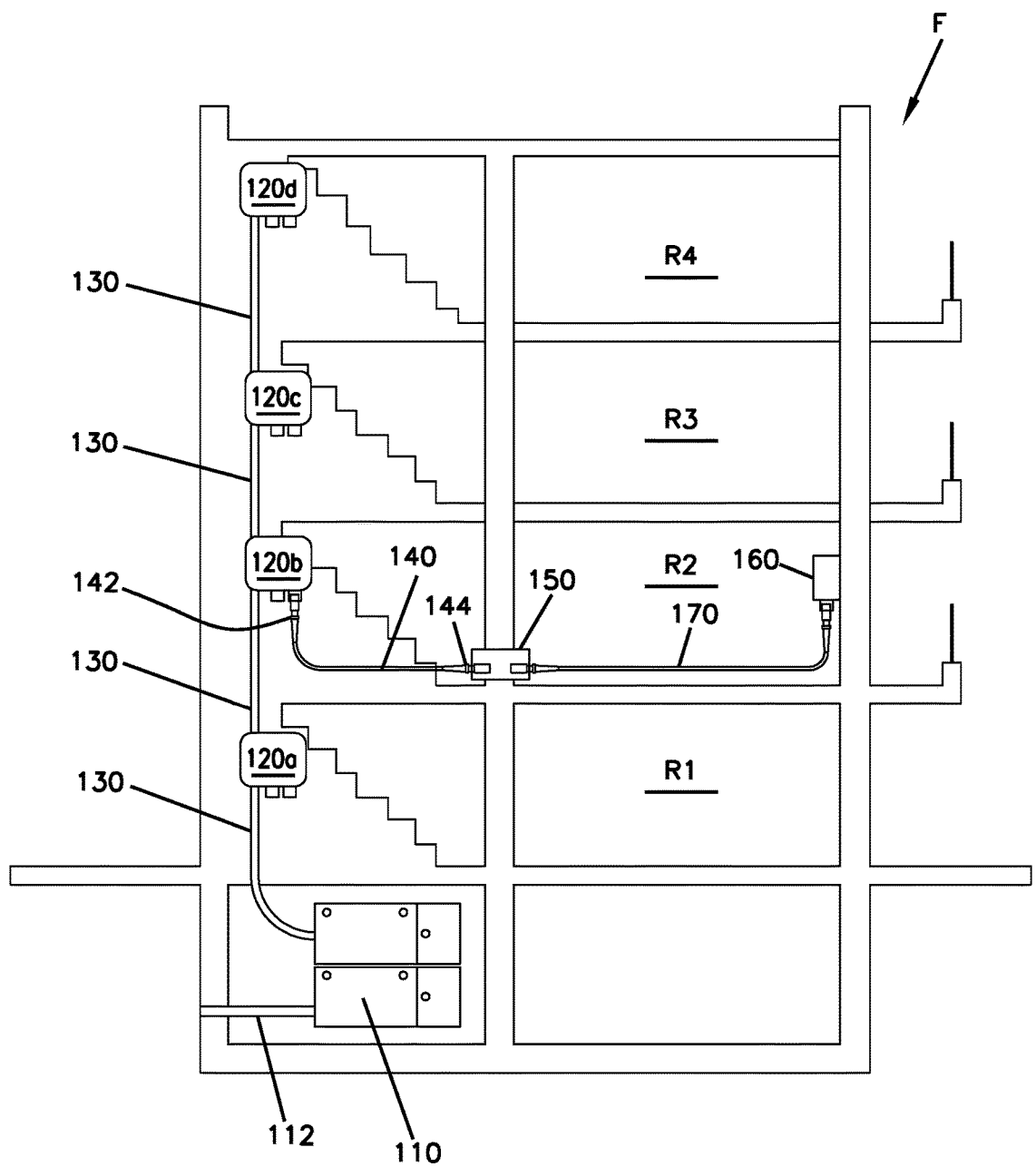
FIG. 1 is a schematic representation of a fiber optic network disposed in a facility.

FIG. 1 is a schematic representation of a fiber optic network 100 disposed in a facility F. In examples, the facility F includes multiple individual residences R (e.g., apartments, condominiums, businesses, etc.). In the example shown, the facility F includes five floors including a basement that each have one or more residences R located thereat. The fiber optic network 100 includes a feeder cable 112 from a central office (not shown). The feeder cable 112 enters a feeder cable input location 110 (e.g., a fiber distribution hub, a network interface device, etc.) disposed at the facility F (e.g., in the basement of the facility). The fiber distribution hub 110 has one or more optical splitters (e.g., 1-to-8 splitters, 1-to-16 splitters, or 1-to-32 splitters) that generate a number of individual fibers.

At least one fiber optic enclosure 120 is mounted at each floor of the facility F. The individual fibers generated by the optical splitters are routed to the fiber optic enclosures 120 via one or more riser cables 130. Subscriber cables 140 are routed from the fiber optic enclosures 120 to respective residences R. In particular, each subscriber cable 140 is routed to a transition box 150 at the respective residence R.

Figure 2:
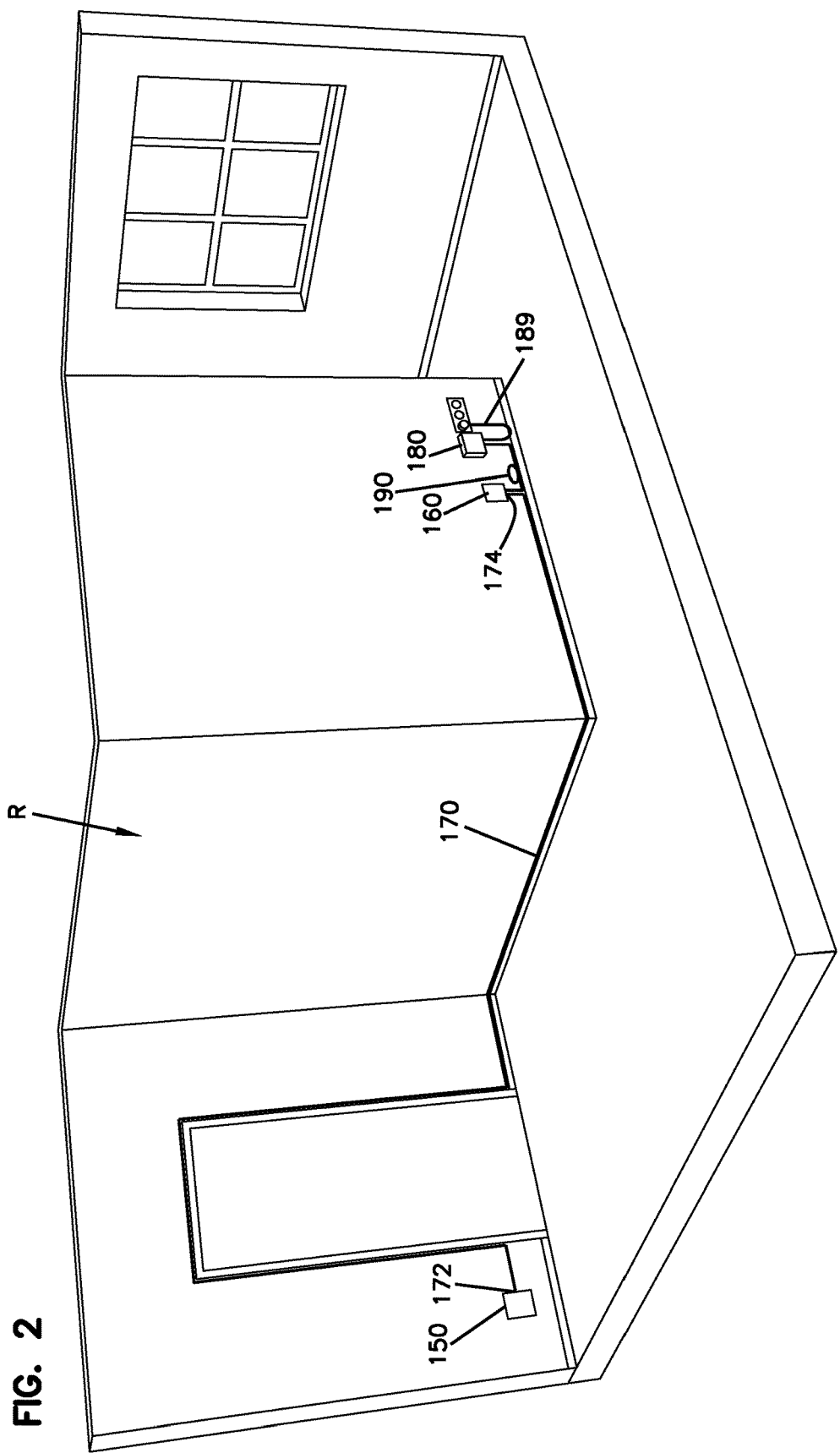
FIG. 2 is a schematic representation of an example residence in which a transition box, a wall outlet box, and a terminal access cable are deployed.
Figure 3:
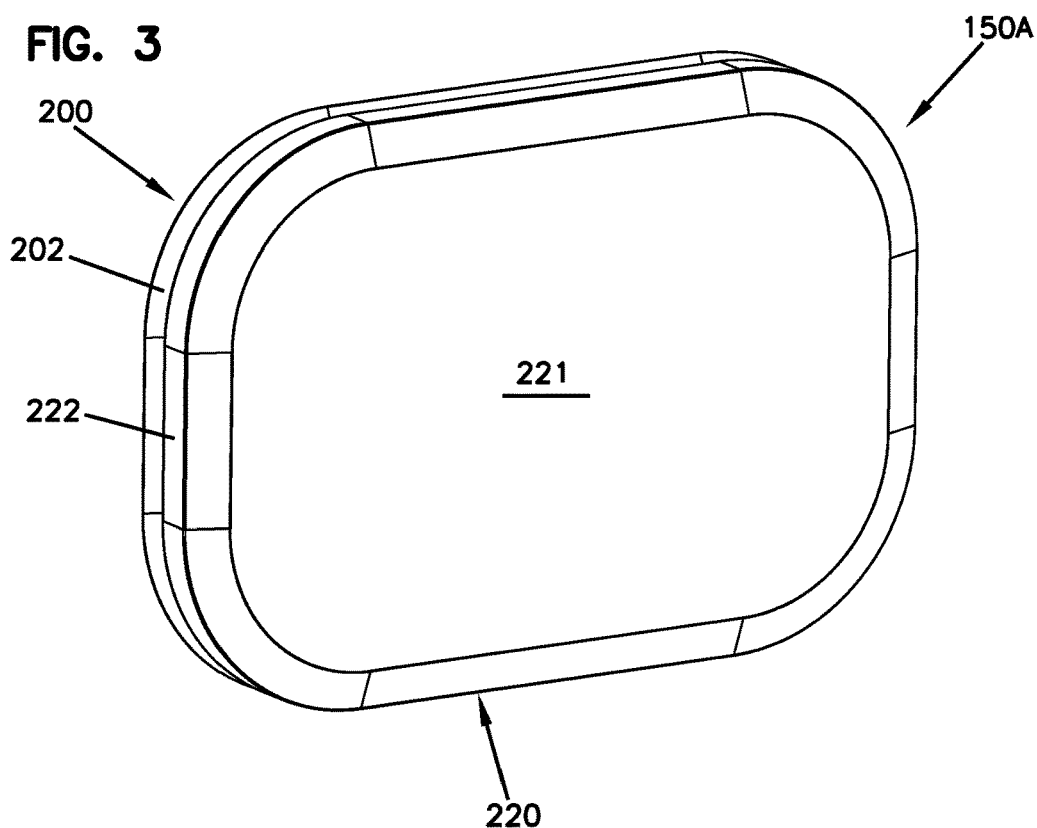
FIG. 3 is a perspective view of a first example termination box including a base and a cover.

FIG. 2 is a schematic representation of an example residence R including walls and a floor defining a room. A transition box 150 is disposed at one of the walls of the room. The transition box 150 is the location at which the subscriber fiber 140 enters the residence R. In the example shown, the transition box 150 is located adjacent an entry door of the residence R. Generally, the transition box 150 is not located at a desirable location for an optical network terminal (ONT) or other equipment.

A wall box 160 is disposed at a more desirable location within the residence R for optical and/or optoelectronic equipment. A terminal access cable 170 extends between the transition box 150 and the wall box 160. Optical signals carried by the subscriber cable 140 are transitioned onto the terminal access cable 170 at the transition box 150. The terminal access cable 170 carries the optical signals to the wall outlet box 160 so that the optical signals are available at one or more ports of the wall outlet box 160. Accordingly, the wall box 160 serves as a demarcation point within the residence R for the optical service provider.

A user can choose to connect an ONT 180 or other equipment to the port of the wall outlet 160 to connect the ONT 180 or other equipment to the fiber optic network 100. For example, a jumper cable 190 can extend between the ONT 180 and the wall outlet 160. The ONT 180 also can have a power cord 189 that plugs into an electrical outlet.

In certain implementations, the terminal access cable 170 can include an optical fiber disposed in a jacket. The terminal access cable 170 can be routed through the room by adhesively affixing the terminal access cable 170 to the walls, floor, ceiling, and/or moldings within the room. In the example shown in FIG. 2, the terminal access cable 170 is routed from the transition box 150, across a wall to the door frame, around the door frame to a floor molding, along the floor molding to a location adjacent the wall outlet 160, and then across a respective wall to the wall outlet 160. Affixing the terminal access cable 170 to the walls/moldings both protects the cable 170 from being pulled, crushed, kinked, or tripped over. Examples of adhesively affixed cables suitable for use as the terminal access cable 170 can be found in U.S. Publication No. 2014/0150971, the disclosure of which is hereby incorporated herein by reference.

The terminal access cable 170 also can be adhesively affixed to the transition box 150 and/or wall outlet 160 to anchor the terminal access cable 170 at these locations.

In some implementations, the terminal access cable 170 can have one or more unterminated ends that are optically spliced (e.g., fusion spliced or mechanically spliced) at the termination box 150 and wall box 160. In other implementations, the terminal access cable 170 can have one or more partially terminated ends that are fully connectorized and plugged into ports at the termination box 150 and wall box 160. The unterminated and partially terminated end can be advantageously routed through small ducts to facilitate passage through walls of the residence R. The partially terminated end can be quickly installed in the field without tools, such as an optical fusion splicer. In still other implementations, one or both ends of the terminal access cable 170 can be fully connectorized so that the end can be plugged into corresponding ports at the transition box 150 and wall outlet 160. The terminated end can be factory installed and factory inspected prior to installation in the field.

Referring to FIGS. 3-19, example transition boxes 150 and wall outlets 160 are configured to receive the terminal access cable 170 from any radial direction, to enable securement of the terminal access cable 170, and to provide storage for excess length of the terminal access cable 170. Each of the transition boxes 150 and wall outlets 160 include a base and a cover that cooperate to define an interior. The base is configured to mount to a wall. The cover is configured to mount to the base. The base defines a transition surface over which the terminal access cable 170 can be routed from the wall to the interior of the base. The base also defines an anchor surface at which the terminal access cable 170 can be affixed to secure the terminal access cable 170 to the base. In examples, the anchor surface defines a corner between the transition surface and an outer flange of the base. The cover mounts to the base so as to leave a gap sufficient to provide access to the anchor surface from any radial direction around the base.

FIGS. 3-6 illustrate a first example transition box 150A configured to receive an unterminated end of the terminal access cable 170 for splicing to an unterminated end of the subscriber cable 140 routed to the transition box 150A. FIGS. 7-11 illustrate a second example transition box 150B configured to receive a terminated of the terminal access cable 170 for connecting to a terminated end of the subscriber cable 140 routed to the transition box 150B. In some implementations, the end is terminated at a factory. In other implementations, the end is terminated in the field.

Figure 4:
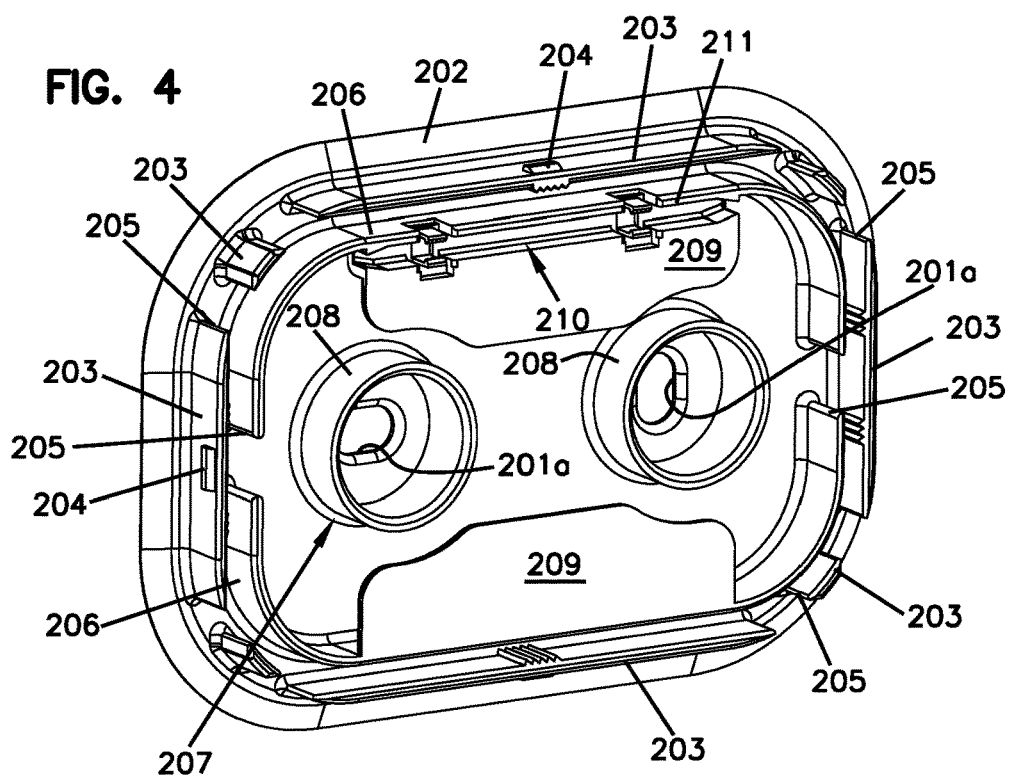
FIG. 4 is a perspective view of the base of the termination box of FIG. 3.
Figure 6:
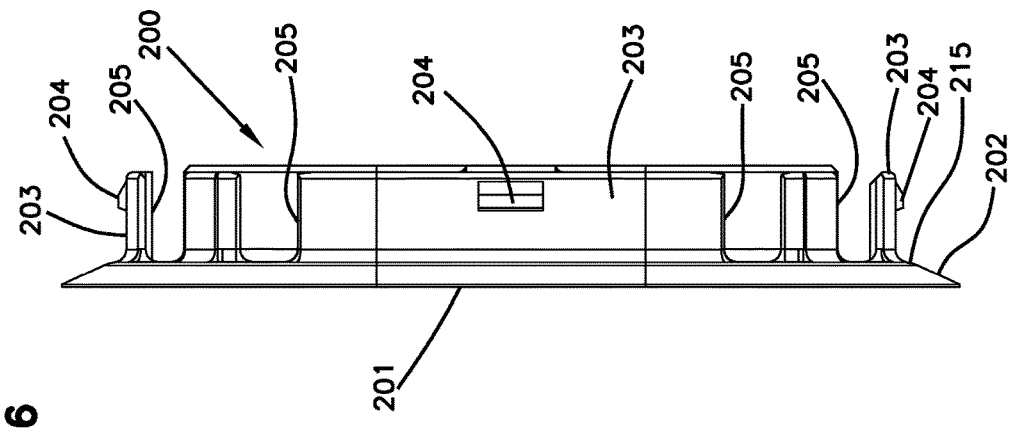
FIG. 6 is a side elevational view of the base of FIG. 4.
Figure 5:
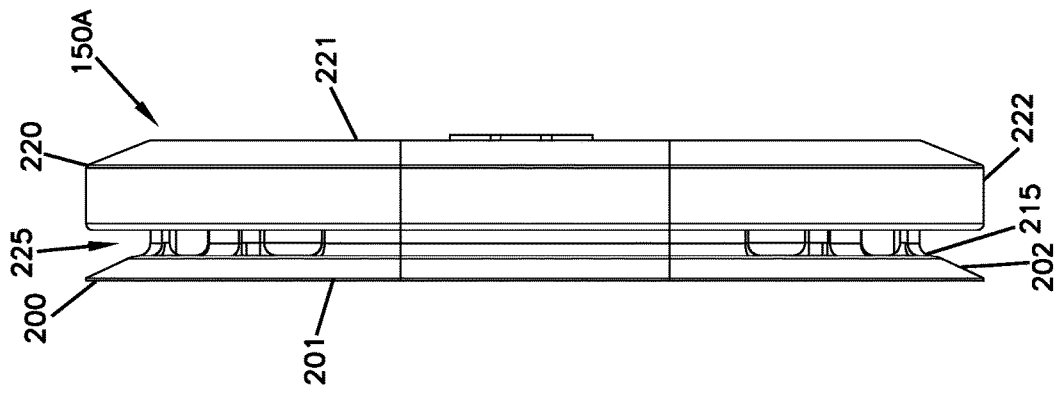
FIG. 5 is a side elevational view of the termination box of FIG. 3.
Figure 9:
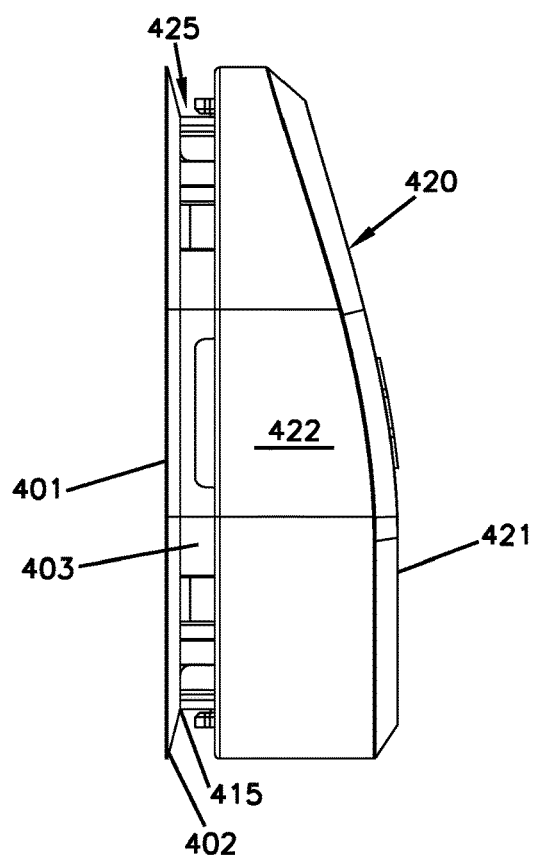
FIG. 9 is a side elevational view of the termination box of FIG. 7.
Figure 10:
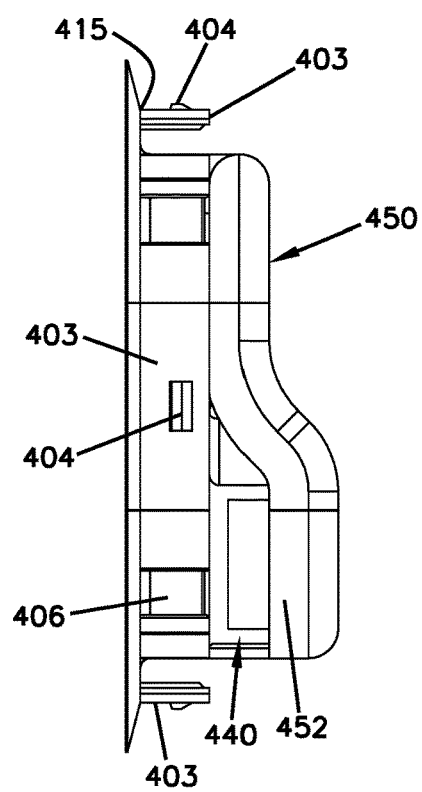
FIG. 10 is a side elevational view of the base of FIG. 8.
Figure 11:
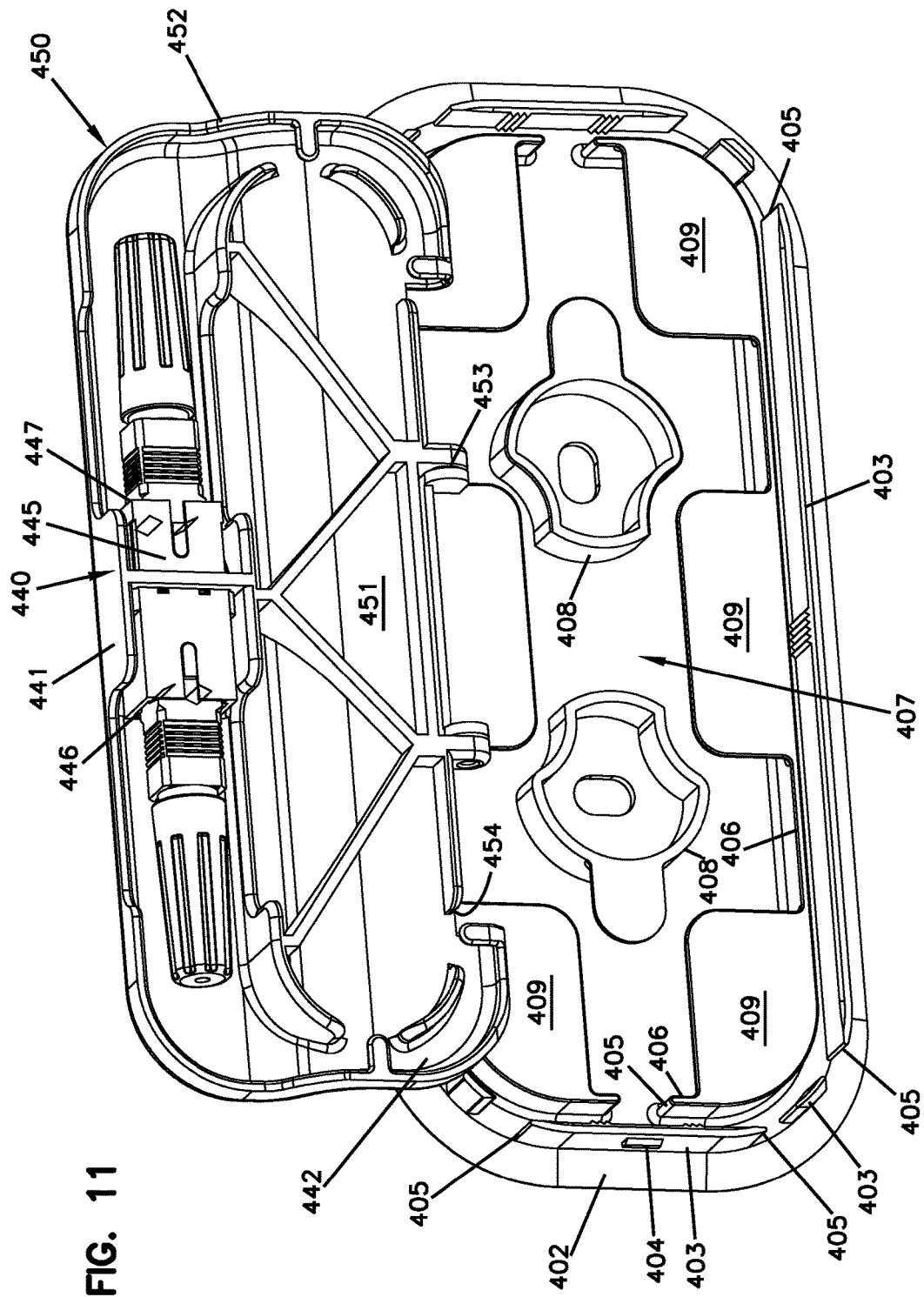
FIG. 11 is a perspective view of the base of the termination box of FIG. 7 with a movable member in an access position.
Figure 12:
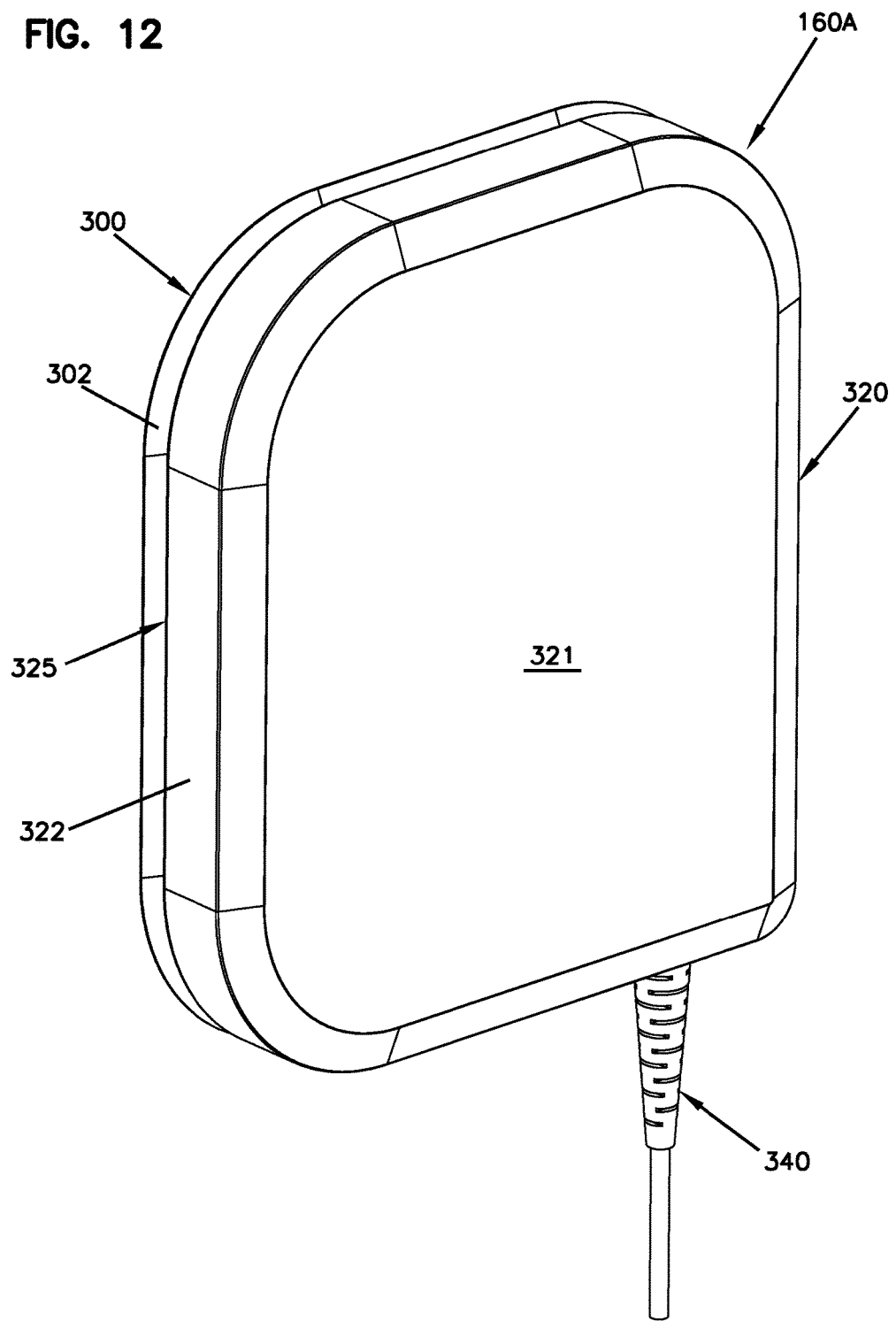
FIG. 12 is a perspective view of a first example wall outlet box including a base and a cover.
Figure 15:
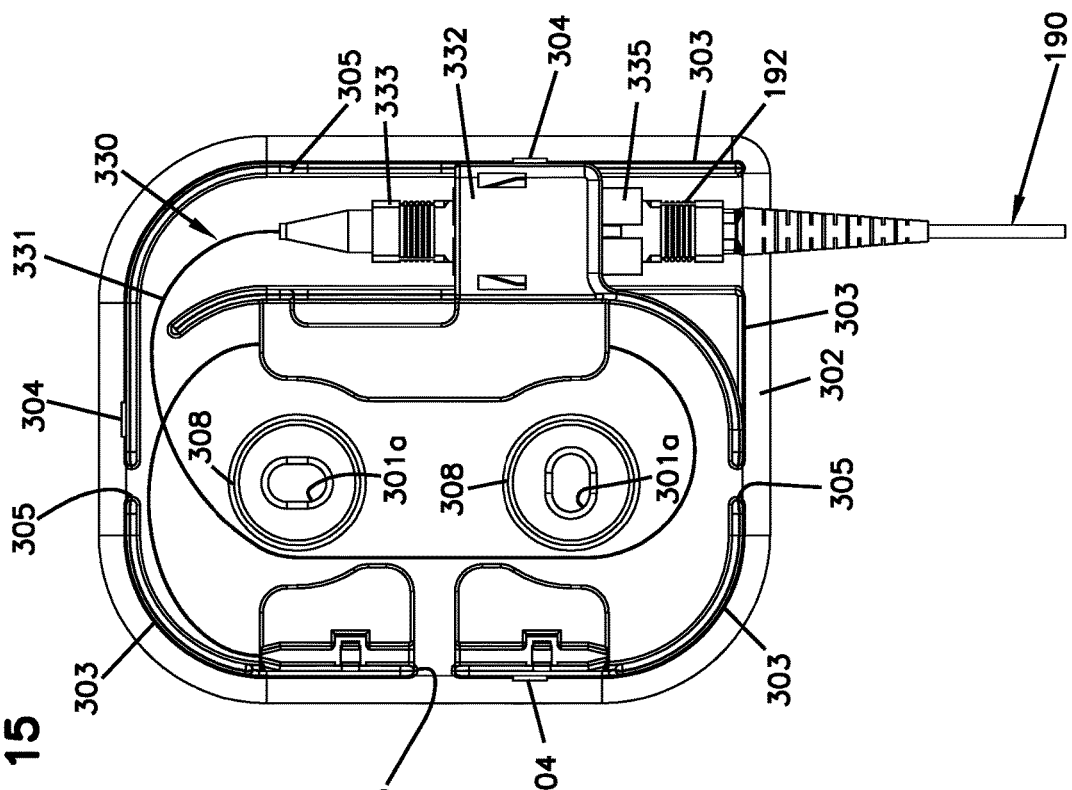
FIG. 15 is a front elevational view of the base of FIG. 14.
Figure 13:
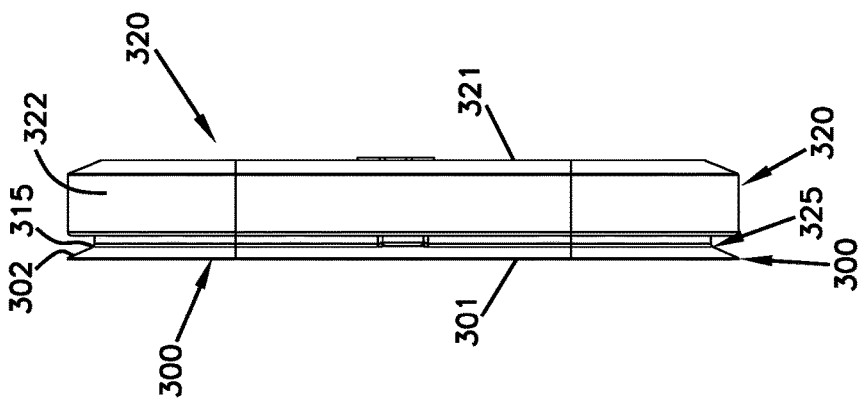
FIG. 13 is a side elevational view of the wall outlet box of FIG. 12.

The example transition box 150A, 150B includes a base 200, 400 and a cover 220, 420. The base 200, 400 has a mounting surface 201, 401 that is configured to secure to a wall or other surface. As shown in FIGS. 4 and 11, an arrangement of one or more outer flanges 203, 403 extends outwardly from the base 200, 400. The base 200, 400 also defines a transition surface 202, 402 that leads from the wall or other surface to the outer flange arrangement (see FIGS. 5 and 9). The transition surface 202, 402 provides a smooth transition from the wall to the base 200, 400. In certain examples, the transition surface 202, 402 tapers towards the wall as the transition surface 202, 402 extends radially outwardly from the interior of the base 200, 400.

The cover 220, 420 includes a circumferential sidewall 222, 422 extending rearwardly from a front wall 221, 421. The sidewall 222, 422 is spaced from the transition surface 202, 402 by a gap 225, 425 to provide radial access to the outer flange 203, 403 (see FIGS. 5 and 9). Latches 204, 404 extend outwardly from at least some of the outer flanges 203, 403 to engage latch surfaces defined at an interior of the cover 220, 420, thereby mounting the cover 220, 420 to the base 200, 400. For example, the latch surfaces may be defined by interior surfaces of the sidewall 222, 422. In certain examples, the outer flanges 203, 403 are sufficiently flexible radially inwards towards the transition box interior to facilitate latching with the cover 220, 420.

In certain implementations, the base 200, 400 defines a storage location 207, 407 within the arrangement of outer flanges 203, 403 (e.g., see FIGS. 4 and 11). For example, the storage location 207, 407 may include one or more spools 208, 408 around which the cable may be wound. In certain examples, two spools 208, 408 are disposed at the storage location 207, 407. An inner wall 206, 406 extends outwardly from the base 200, 400 between the storage location 207, 407 and the arrangement of outer flanges 203, 403. The inner wall 206, 406 defines an outer boundary of the storage location 207, 407. Transverse flanges 209, 409 extend inwardly from the inner wall 206, 406 to aid in retaining the cable at the storage location 207, 407.

Gaps 205, 405 are provided in both the arrangement of outer flanges 203, 403 and the inner wall 206, 406 to enable passage of a cable therethrough. For example, the outer flanges 203, 403 can be spaced to provide gaps 205, 405 between edges of the outer flanges 203, 403. In examples, the inner wall 206, 406 can include two inner flanges spaced from each other to define the gaps 205, 405. A sufficient number of gaps 205, 406 are provided to enable the cable to be routed into the transition box interior from any direction along the wall. In certain examples, at least four gaps 205, 405 are defined by the outer flanges 203, 403. In the examples shown, eight gaps 205, 405 are provided at the outer flanges 203, 403. In other examples, however, a greater or lesser number of gaps can be provided.

In the first example transition box 150A, the base 200 defines a splice location 210 within the inner wall 206. In certain examples, the inner wall 206 partially forms the splice location 210. For example, part of the inner wall 206 can form one side of a splice sleeve holder 211 at which a sleeve enclosed splice can be disposed. When the cover 220 is mounted to the base 200, the front 221 of the cover 220 extends over the splice location 210 and the storage location 207 to inhibit access thereto.

In use, the subscriber cable 140 is routed into a residence R through a wall. An unterminated end of the subscriber cable 140 is optically spliced to an unterminated end of the terminal access cable 170 at a splice. In examples, a splice protection sleeve is mounted over the splice. The base 200 of the transition box 150A is mounted to the wall (e.g., by inserting fasteners through fastener openings 201a) where the subscriber cable is routed through. The splice (and protection sleeve) are disposed at the splice location 210 of the base 200. Excess length of the terminal access cable 170 is routed around the storage location 207. In certain examples, excess length of the subscriber cable 140 also can be routed around the storage location 207.

The terminal access cable 170 is routed through the gaps 205 in the inner wall 206 and outer flange arrangement 203 to reach an anchor surface 215 defined by the outer flange arrangement 203. The terminal access cable 170 is adhesively affixed to the anchor surface 215. In the example shown, the anchor surface 215 is disposed at the corner between the outer flange arrangement 203 and the transition surface 202 (see FIG. 4). The terminal access cable 170 is routed over the transition surface 202 to the wall. In certain examples, the terminal access cable 170 is adhesively affixed to the transition surface. The cover 220 is mounted to the base 200, leaving a gap 225 sized to accommodate the cable 170 passing between the base 200 and the cover 220. In certain examples, the terminal access cable 170 is adhesively affixed to the wall as the terminal access cable extends away from the transition box 150A.

In the second example transition box 150B, the base 400 defines a termination location 440 at which an optical adapter 445 is disposed. The optical adapter 445 defines at least a first port 446 and a second port 447 opposite the first port. A mounting structure 441 holds the optical adapter 445 at the termination location 440. A routing passage 442 leads from the storage region 407 to the termination location 440. When the cover 420 is mounted to the base 400, the front 421 of the cover 420 extends over the termination location 440 and the storage location 407 to inhibit access thereto.

In certain implementations, the termination location 440 is disposed at a movable member 450 coupled to the base 400. The movable member 450 is movable between an access position (FIG. 11) and a storage position (FIG. 8). The cover 420 of the termination box 150B covers the movable member 450 (and hence the termination location 440) when mounted to the base 400 (compare FIGS. 9 and 10). In certain examples, the movable member 450 pivots relative to the base 400 on hinges 453. The movable member 450 includes a surface 451 at which the mounting structure 441 is disposed. In certain implementations, the surface 451 faces the storage location 407 when the movable member is disposed in the storage position. In certain implementations, a circumferential wall 452 extends outwardly from the surface 451. Gaps or notches 454 are provided in the circumferential wall 452 adjacent the hinges 453 to enable the cable 170 to be routed from the storage location 407 to the termination location 440.

In use, the subscriber cable 140 is routed into a residence R through a wall. The base 400 of the transition box 150B is mounted to the wall (e.g., by inserting fasteners through fastener openings 401a) where the subscriber cable is routed through. A terminated end of the subscriber cable 140 is plugged into a port of the optical adapter 445. In certain examples, a partially terminated end of the subscriber cable 140 is first fully terminated by attaching a connector housing to the end of the subscriber cable 140 (e.g., to a ferrule holding an optical fiber).

A terminated end of the terminal access cable 170 is plugged into the other port of the optical adapter 445. In certain examples, a partially terminated end of the terminal access cable 170 is first fully terminated by attaching a connector housing to an end of the terminal access cable 170 (e.g., to a ferrule holding an optical fiber). In certain examples, excess length of the terminal access cable 170 can be routed around the storage location 407. The terminal access cable 170 is routed from the termination location 440, along the routing passage 442, through the gaps 454 in the circumferential wall 452, and towards the base 400.

Excess length of the terminal access cable 170 can be wound around the storage location 407 of the base 400. In certain examples, excess length of the subscriber cable 140 can be routed around the storage location 207. From the storage location 407, the terminal access cable 170 can be routed through a gap 405 in the inner wall 406 and outer flange arrangement 403 to reach an anchor surface 415 defined by the outer flange arrangement 403. The terminal access cable 170 is adhesively affixed to the anchor surface 415. In the example shown, the anchor surface 415 is disposed at the corner between the outer flange arrangement 403 and the transition surface 402 (see FIG. 10). The terminal access cable 170 is routed over the transition surface 402 to the wall. In certain examples, the terminal access cable 170 is adhesively affixed to the transition surface 402. The cover 420 is mounted to the base 400, leaving a gap 425 sized to accommodate the cable 170 passing between the base 400 and the cover 420. In certain examples, the terminal access cable 170 is adhesively affixed to the wall as the terminal access cable extends away from the transition box 150B.

FIGS. 12-19 illustrate example wall outlet boxes 160A, 160B that hold optical adapters 335, 535 that define ports 337, 537 at which a connectorized end of a jumper cable 190 can be plugged. FIGS. 12-15 illustrate a first example wall outlet box 160A configured to receive an unterminated end of the terminal access cable 170 for splicing to an unterminated end of a connectorized pigtail fiber 331. A connectorized end 333 of the pigtail fiber 331 plugs into a port 336 of the adapter 335 opposite the port 337. FIGS. 16-19 illustrate a second example wall outlet box 160B configured to receive a terminated end of the terminal access cable 170 at a port 536 of the optical adapter 535 opposite the port 537. In some implementations, the end of the terminal access cable 170 is terminated at a factory. In other implementations, the end of the terminal access cable 170 is terminated in the field.

Figure 14:
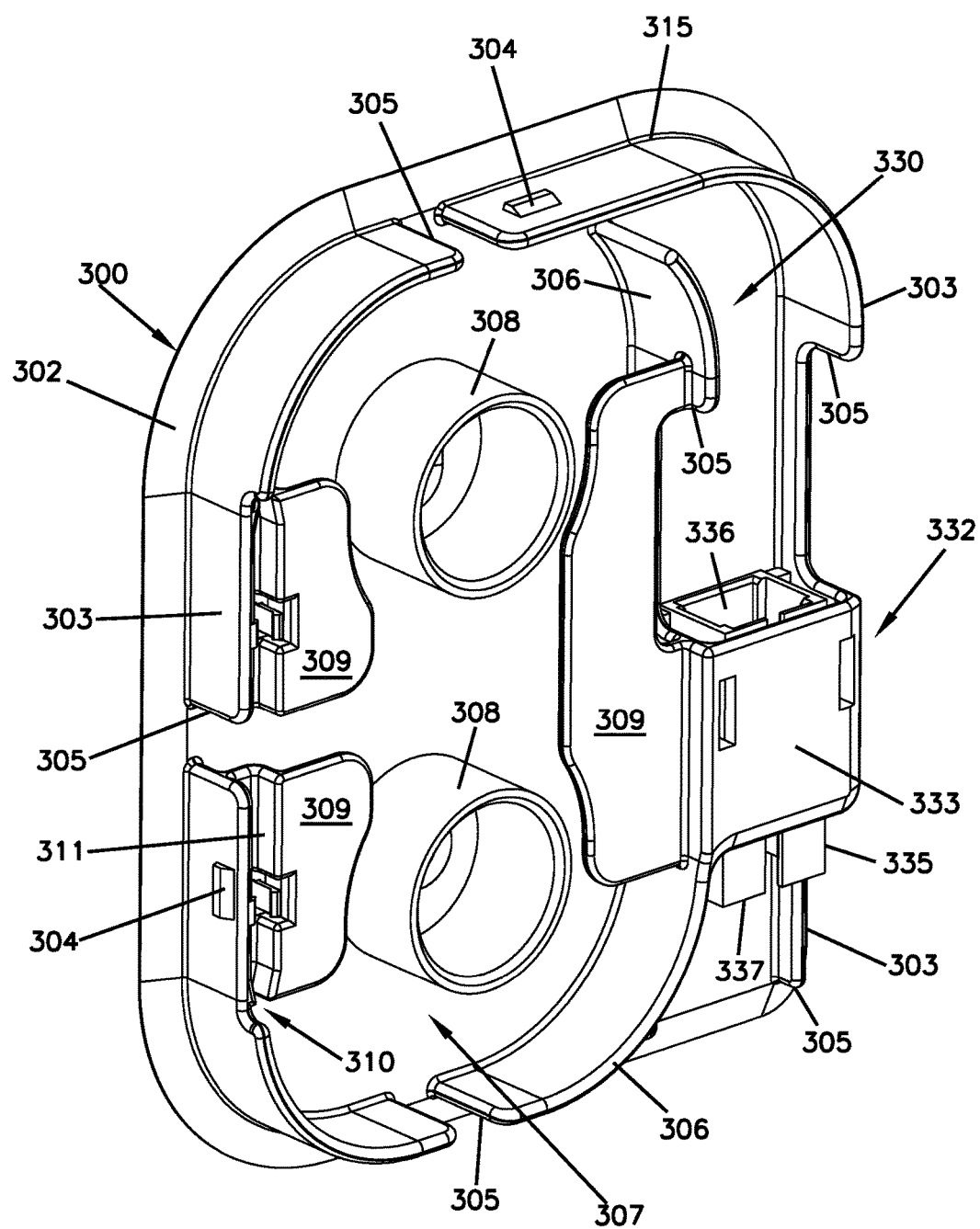
FIG. 14 is a perspective view of the base of FIG. 12.
Figure 19:
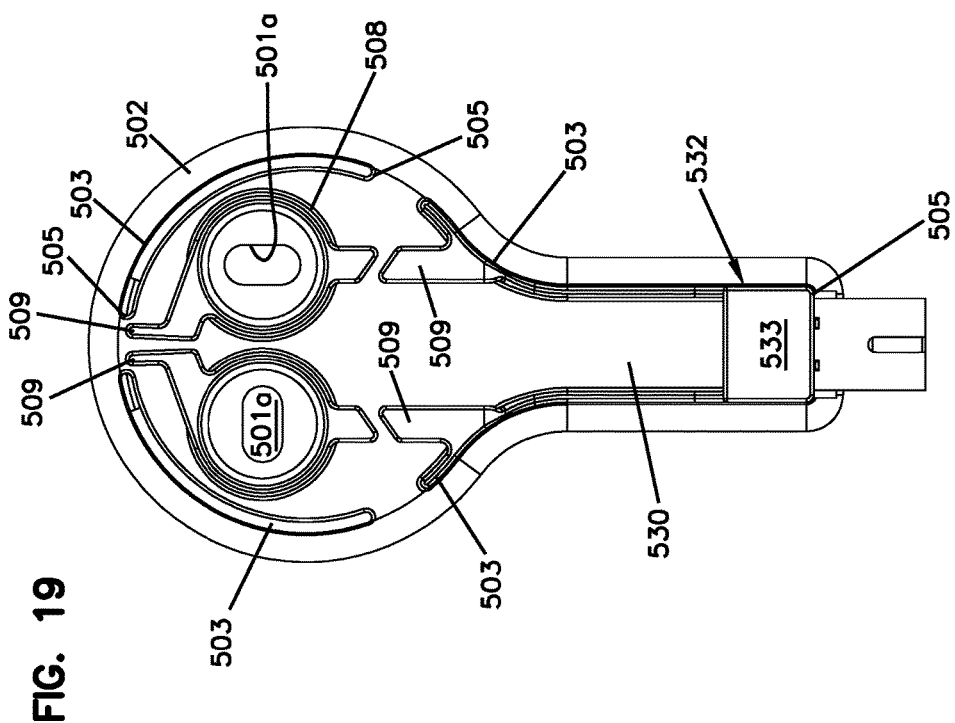
FIG. 19 is a front elevational view of the base of FIG. 18.
Figure 18:
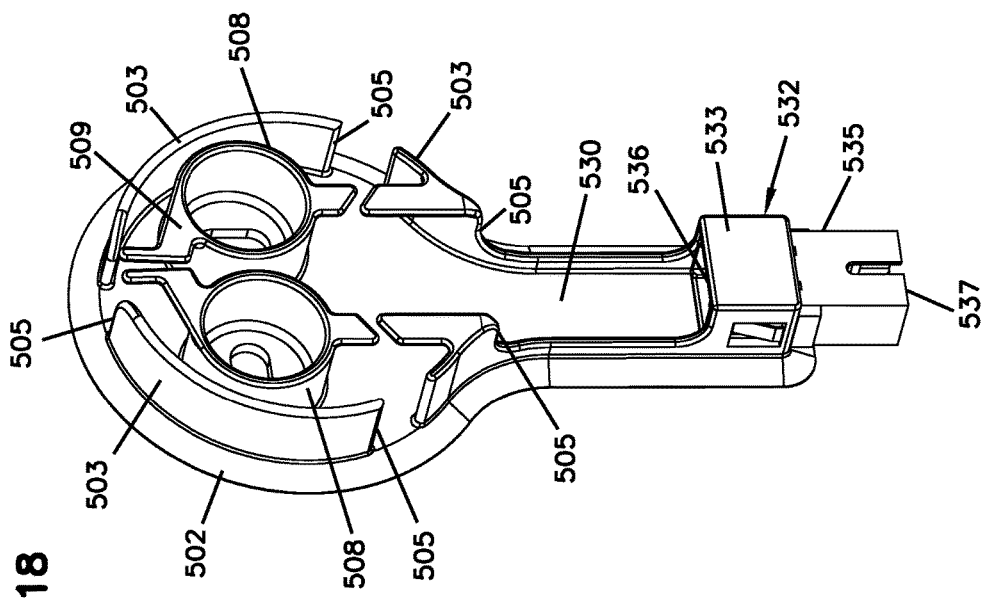
FIG. 18 is a perspective view of the base of FIG. 16.

The example wall outlet box 160A, 160B includes a base 300, 500 and a cover 320, 520. The base 300, 500 has a mounting surface 301, 501 that is configured to secure to a wall or other surface. As shown in FIGS. 14 and 18, an arrangement of one or more outer flanges 303, 503 extends outwardly from the base 300, 500. The base 300, 500 also defines a transition surface 302, 502 that leads from the wall or other surface to the outer flange arrangement (see FIGS. 13 and 17). The transition surface 302, 502 provides a smooth transition from the wall to the base 300, 500. In certain examples, the transition surface 302, 502 tapers towards the wall as the transition surface 302, 502 extends radially outwardly from the interior of the base 300, 500.

The cover 320, 520 includes a circumferential sidewall 322, 522 extending rearwardly from a front wall 321, 521. The sidewall 322, 522 is spaced from the transition surface 302, 502 by a gap 325, 525 to provide radial access to the outer flange 303, 503 (see FIGS. 13 and 17). In certain implementations, latches 304 extend outwardly from at least some of the outer flanges 303, 503 to engage latch surfaces defined at an interior of the cover 320, 520, thereby mounting the cover 320, 520 to the base 300, 500. For example, the latch surfaces may be defined by interior surfaces of the sidewall 322, 522. In certain examples, the outer flanges 303, 503 are sufficiently flexible radially inwards towards the transition box interior to facilitate latching with the cover 320, 520.

In certain implementations, the base 300, 500 defines a storage location 307, 507 within the arrangement of outer flanges 303, 503. For example, the storage location 307, 507 may include one or more spools 308, 508 around which the cable may be wound. In certain examples, two spools 308, 508 are disposed at the storage location 307, 507. Certain portions of the outer flange arrangement 303, 503 define an outer boundary of the storage location 307, 507. Transverse flanges or fingers 309, 509 extend inwardly from the outer flange arrangement 303, 503 to aid in retaining the cable at the storage location 307, 507.

Gaps 305, 505 are provided in the arrangement of outer flanges 303, 503 to enable passage of a cable therethrough. For example, the outer flanges 303, 503 can be spaced to provide gaps 305, 505 between edges of the outer flanges 303, 503. A sufficient number of gaps 305, 505 are provided to enable the cable to be routed into the wall outlet box interior from any direction along the wall. In certain examples, at least four gaps 305, 505 are defined by the outer flanges 303, 503. In other examples, however, a greater or lesser number of gaps can be provided.

The base 300, 500 also defines a routing channel 330, 530 that leads from the storage location 307, 507 to the termination location 332, 532. A mounting flange 333, 533 extends across the routing channel 330, 530 to hold the optical adapter 335, 535 at the termination location 332, 532. The optical adapter 335, 535 is oriented so that the first port 336, 536 faces the routing passage 330, 530 and the second port 337, 537 faces a gap 305, 505 in the outer flange arrangement 303, 503.

In some implementations, the base 500 of the wall outlet box 160B has a routing channel 530 extending radially outwardly from the storage location 507. In the example shown in FIGS. 16-19, the wall outlet box 160B has a light-bulb shape. In use, the base 500 of the wall outlet box 160B is mounted to the wall (e.g., by inserting fasteners through fastener openings 501*a*). The terminal access cable 170 is adhesively affixed to the wall as the terminal access cable extends towards from the wall outlet box 160B.

The terminal access cable 170 is routed over the transition surface 502 of the base 500. In certain examples, the terminal access cable 170 is adhesively affixed to the transition surface 502. The terminal access cable 170 is adhesively affixed to an anchor surface 515 defined by the outer flange arrangement 503. In the example shown, the anchor surface 515 is disposed at the corner between the outer flange arrangement 503 and the transition surface 502 (see FIG. 17). The terminal access cable 170 is routed from the anchor surface 515 through the gaps 505 in the inner wall 506 and/or outer flange arrangement 503 to reach the wall outlet box interior.

The terminated end of the terminal access cable 170 is plugged into the port 536 of the optical adapter 535. Excess length of the terminal access cable 170 is routed around the storage location 507. The cover 520 is mounted to the base 500, leaving a gap 525 sized to accommodate the cable 170 passing between the base 500 and the cover 520.

In other implementations, the base 300 of the wall outlet box 160A has a routing channel 330 disposed side-by-side with the storage location 307. In certain examples, the storage location 307 is elongated along a dimension and the storage spools 308 are aligned along the dimension. The adapter 335 is oriented so that the insertion axes of the ports 336, 337 extend along the dimension.

In certain implementations, the base 300 defines a splice location 310 within the outer flange arrangement 303. In certain examples, the outer flange arrangement 303 partially forms the splice location 310. For example, part of the outer flange arrangement 303 can form one side of a splice sleeve holder 311 at which a sleeve enclosed splice can be disposed. When the cover 320 is mounted to the base 300, the front 321 of the cover 320 extends over the splice location 310 and the storage location 307 to inhibit access thereto.

In certain implementations, an inner wall 306 extends outwardly from the base 300 between the storage location 307 and the termination location 332. The inner wall 306 cooperates with a first portion of the outer flange arrangement 303 to define an outer boundary of the storage location 307. The inner wall 306 may define a gap 305 through which the cable 170 can pass to enter the storage location 307. In certain examples, transverse flanges 309 extend inwardly from the inner wall 306 to aid in retaining the cable at the storage location 307. The inner wall 306 also cooperates with a second portion of the outer flange arrangement 303 to define the routing channel 330 to the termination location 332. A gap between the inner wall 306 and the outer flange arrangement 303 provides access to the routing channel 330.

In use, the base 300 of the wall outlet box 160A is mounted to the wall (e.g., by inserting fasteners through fastener openings 301*a*). In certain examples, the fiber pigtail is pre-cabled so that the connectorized end is received at the first adapter port 336 and the unterminated end is disposed at the splice location 310. The terminal access cable 170 is adhesively affixed to the wall as the terminal access cable extends towards from the wall outlet box 160A.

The terminal access cable 170 is routed over the transition surface 302 of the base 300. In certain examples, the terminal access cable 170 is adhesively affixed to the transition surface 302. The terminal access cable 170 is adhesively affixed to an anchor surface 315 defined by the outer flange arrangement 303. In the example shown, the anchor surface 315 is disposed at the corner between the outer flange arrangement 303 and the transition surface 302 (see FIG. 13). The terminal access cable 170 is routed from the anchor surface 315 through the gaps 305 in the inner wall 306 and/or outer flange arrangement 303 to reach the wall outlet box interior.

An unterminated end of the terminal access cable 170 is spliced to the unterminated end of the pigtail fiber 331 at a splice. In examples, a splice protection sleeve is mounted over the splice. The splice and protection sleeve are disposed at the splice location 310 of the base 300. Excess length of the terminal access cable 170 is routed around the storage location 307. In certain examples, excess length of the fiber pigtail 331 also can be routed around the storage location 307 (e.g., see FIG. 15). The cover 320 is mounted to the base 300, leaving a gap 325 sized to accommodate the cable 170 passing between the base 300 and the cover 320.

To connect an ONT 180 or other optical/optoelectronical equipment to the network, a jumper cable 190 extends from the ONT 180 or other equipment to the wall outlet 160A, 160B. The cover 320, 520 is removed to provide access to the termination location 332, 532. The jumper cable 190 is routed through a gap in the outer flange arrangement 303, 503 and a connectorized end 192 of the jumper cable 190 is plugged into the second port 337, 537 of the optical adapter 335, 535. The cover 320, 520 is mounted to the base 300, 500, leaving a gap 325, 525 sized to accommodate the jumper cable 190 (as well as the terminal access cable 170) passing between the base 300, 500 and the cover 320, 520.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

LIST OF REFERENCE NUMERALS AND
CORRESPONDING FEATURES 100 fiber optic network
F facility
R residences
112 feeder cable
110 cable input location
120 fiber optic enclosure
130 riser cable
140 subscriber cable
150, 150A, 150B transition box
160, 160A, 160B, 160C wall outlet box
170 terminal access cable
180 ONT
190 jumper cable
200, 300, 400, 500, base
201, 301, 401, 501 mounting surface
201*a*, 301*a*, 401*a*, 501*a* fastener openings
202, 302, 402, 502 transition surface
203, 303, 403, 503 outer flange arrangement
204, 304, 404 latches
205, 305, 405, 505 gap
206, 306, 406 inner wall
207, 307, 407, 508 storage location
208, 308, 408, 508 spools
209, 309, 409, 509 transverse flanges
210, 310 splice location
211, 311 splice sleeve holder
215, 315, 415, 515 anchor surface 220, 320, 420, 520 cover
221, 321, 421, 521 front wall
222, 322, 422, 522 sidewall
225, 325, 425, 525 gap
330, 530 routing channel
331 pigtail fiber
332, 532 termination location
333 connectorized end
335, 535 optical adapter
336, 536 first port
337, 537 second port
440 termination location
441 mounting structure
442 routing passage
445 optical adapter
446 first port
447 second port
450 movable member
451 surface
452 circumferential wall
453 hinges
454 gap/notch

What is claimed is:

1. A cable management box comprising:
   a base including:
      a mounting surface configured to secure to a wall,
      an arrangement of one or more outer flanges extending outwardly from the base opposite the mounting surface, and
      a transition surface that leads from the wall to the outer flange arrangement, the transition surface extending around a periphery of the base,
   the base defining an anchor surface between the transition surface and the outer flanges,
   the base also defining a storage location at which a storage spool is disposed,
   the arrangement of outer flanges defining gaps that lead from the transition surface to the storage location; and
   wherein the transition surface tapers towards the wall as the transition surface extends radially outwardly from an interior of the base.

2. The cable management box of claim 1, wherein the cable management box is a transition box.

3. The cable management box of claim 2, wherein the transition box is configured to hold an optical splice between a subscriber cable and a terminal access cable.

4. The cable management box of claim 3, wherein the base defines a splice location at which a splice sleeve holder is disposed.

5. The cable management of claim 4, wherein the splice location is disposed within an inner wall, which is disposed within the arrangement of outer flanges.

6. The cable management box of claim 2, wherein the transition box is configured to hold an optical adapter receiving a connectorized end of a subscriber cable and a connectorized end of a terminal access cable.

7. The cable management box of claim 6, wherein the base defines a termination location at which the optical adapter is disposed.

8. The cable management box of claim 7, wherein the termination location is disposed on a movable member coupled to the base, the movable member being movable between an access position and a storage position.

9. The cable management box of claim 1, wherein the cable management box is a wall outlet box defining a routing channel that leads from the storage location to a termination location.

10. The cable management box of claim 9, further comprising an optical adapter disposed at the termination location, the optical adapter defining a first port and a second port, the second port facing one of the gaps in the arrangement of outer flanges.

11. The cable management box of claim 10, wherein the routing channel extends radially outwardly from the storage location.

12. The cable management box of claim 10, wherein the wall outlet box has a light-bulb shape.

13. The cable management box of claim 10, wherein the routing channel is disposed side-by-side with the storage location.

14. The cable management box of claim 10, wherein the base defines a splice location within the outer flange arrangement.

15. The cable management box of claim 1, further comprising a cover that mounts to the base, the cover being spaced from the base by a gap sized to accommodate a cable extending over the transition surface.

16. The cable management box of claim 15, wherein the cover is latched to the base.

17. A method of cabling a terminal access cable comprising:
   mounting a transition box to a wall and routing a subscriber cable along a transition surface of the transition box, through an aperture in an outer wall of the transition box, and into an interior of the transition box, the transition surface being contoured between the wall and the interior of the transition box;
   optically coupling an end of the subscriber cable to a first end of a terminal access cable within the transition box;
   anchoring the terminal access cable to an anchor surface of the transition box with adhesive;
   storing excess length of the terminal access cable at a storage location within the transition box;
   routing the terminal access cable from the transition box to a wall outlet box;
   anchoring the terminal access cable to an anchor surface of the wall outlet box with adhesive; and
   routing a second end of the terminal access cable into the wall outlet box and optically coupling the second end to a port of an optical adapter disposed within the wall outlet box, whereby a jumper cable can be optically coupled to the subscriber cable by plugging a connectorized end of the jumper cable into the port.

18. The method of claim 17, wherein optically coupling an end of the subscriber cable to a first end of a terminal access cable comprises splicing an unterminated end of the subscriber cable to an unterminated first end of the terminal access cable.

19. The method of claim 17, wherein optically coupling an end of the subscriber cable to a first end of a terminal access cable comprises:
   mounting optical connector housings to partially connectorized ends of the subscriber cable and terminal access cable; and
   plugging the optical connector housings into an optical adapter disposed within the transition box.

20. The method of claim 17, wherein optically coupling the second end to a port of an optical adapter comprises splicing the second end to a fiber pigtail that has a connectorized end plugged into another port of the optical adapter.

21. The method of claim 17, wherein optically coupling the second end to a port of an optical adapter comprises plugging the second end into another port of the optical adapter.

22. The method of claim 17, wherein routing the terminal access cable from the transition box to the wall outlet box includes routing the terminal access cable over transition surfaces of the transition box and the wall outlet box.

23. A cable management box comprising:
- a base including a mounting surface configured to secure to a wall, an arrangement of one or more outer flanges extending outwardly from the base opposite the mounting surface, and a transition surface that leads from the wall to the outer flange arrangement, the base defining an anchor surface between the transition surface and the outer flanges, the base also defining a storage location at which a storage spool is disposed, the arrangement of outer flanges defining gaps that lead from the transition surface to the storage location; and
- a movable member coupled to the base, the termination location being disposed on the movable member, the movable member being movable between an access position and a storage position;
- an optical adapter configured to receive a connectorized end of a subscriber cable and a connectorized end of a terminal access cable, the optical adapter being disposed at the termination location.

\* \* \* \* \*